US008599990B2

(12) United States Patent
Bausch et al.

(10) Patent No.: US 8,599,990 B2
(45) Date of Patent: Dec. 3, 2013

(54) PROCESS FOR APPLICATION OF LUBRICANT TO FUEL ROD DURING FUEL ASSEMBLY LOADING PROCESS

(75) Inventors: Michael O. Bausch, Lexington, SC (US); David C. Crone, Lexington, SC (US); Randal K. Lincoln, Columbia, SC (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 647 days.

(21) Appl. No.: 12/644,257

(22) Filed: Dec. 22, 2009

(65) Prior Publication Data

US 2011/0150163 A1    Jun. 23, 2011

(51) Int. Cl.
| | |
|---|---|
| *G21C 3/32* | (2006.01) |
| *G21C 21/00* | (2006.01) |
| *G21C 19/02* | (2006.01) |
| G21C 3/00 | (2006.01) |
| G21C 19/00 | (2006.01) |

(52) U.S. Cl.
USPC ........... 376/267; 376/260; 376/261; 376/264; 376/463; 376/900; 376/901; 376/902

(58) Field of Classification Search
USPC ......... 376/415, 260, 261, 409, 438, 277, 305, 376/412, 414, 416, 426, 434, 442, 264, 267, 376/463, 900, 901, 902; 508/515, 110, 113, 508/115, 131, 202, 205, 221, 232, 243, 268, 508/287, 290, 291, 292, 459, 463, 465, 485, 508/492, 494, 495, 269, 270, 271, 272, 279, 508/462, 577, 579
See application file for complete search history.

(56) References Cited

U.S. PATENT DOCUMENTS

| | | | | | |
|---|---|---|---|---|---|
| 3,046,223 | A | * | 7/1962 | Morris | 508/115 |
| 3,083,160 | A | * | 3/1963 | Agins et al. | 508/131 |
| 3,216,941 | A | * | 11/1965 | De Vries | 508/292 |
| 3,336,227 | A | * | 8/1967 | Noeske et al. | 508/202 |
| 3,383,315 | A | * | 5/1968 | Noeske et al. | 508/205 |
| 3,757,403 | A | * | 9/1973 | Bleiberg | 376/442 |
| 3,773,668 | A | * | 11/1973 | Denis et al. | 508/494 |
| 3,912,642 | A | * | 10/1975 | Sturwold et al. | 508/494 |
| 4,071,639 | A | * | 1/1978 | Palmer et al. | 376/305 |
| 4,212,750 | A | * | 7/1980 | Gorman | 508/279 |
| 4,343,659 | A | * | 8/1982 | Murakami et al. | 376/416 |
| 4,497,720 | A | * | 2/1985 | Moriga et al. | 508/579 |
| 4,661,275 | A | * | 4/1987 | Forsberg et al. | 508/232 |
| 5,028,382 | A | * | 7/1991 | King et al. | 376/261 |
| 5,238,590 | A | * | 8/1993 | Mizui et al. | 508/462 |
| 5,342,531 | A | * | 8/1994 | Walters et al. | 508/272 |
| 5,703,916 | A | * | 12/1997 | Wilhelm et al. | 376/260 |
| 6,127,324 | A | * | 10/2000 | Tolfa et al. | 508/463 |
| 6,841,522 | B2 | * | 1/2005 | Corner et al. | 508/495 |
| 7,179,769 | B2 | * | 2/2007 | Sunkara | 508/579 |

OTHER PUBLICATIONS

W.H. Millett, "Polyalkylene Glycol Synthetic Lubricants"; Industrial and Engineering Chemistry; vol. 42, No. 12, pp. 2436-2441; Dec. 1950.*

* cited by examiner

*Primary Examiner* — Bernarr Gregory
(74) *Attorney, Agent, or Firm* — Joseph C. Spadacene; Westinghouse Electric Company LLC

(57) ABSTRACT

The present invention relates generally to nuclear reactors, and more particularly, to nuclear reactors having fuel assemblies that employ support grids. A method of reducing friction and physical contact between a fuel rod and support grid in a nuclear fuel assembly is provided. The method includes applying a lubricant composition to the outer surface of the fuel rod during fuel assembly fabrication and removing the lubricant composition afterward.

8 Claims, 1 Drawing Sheet

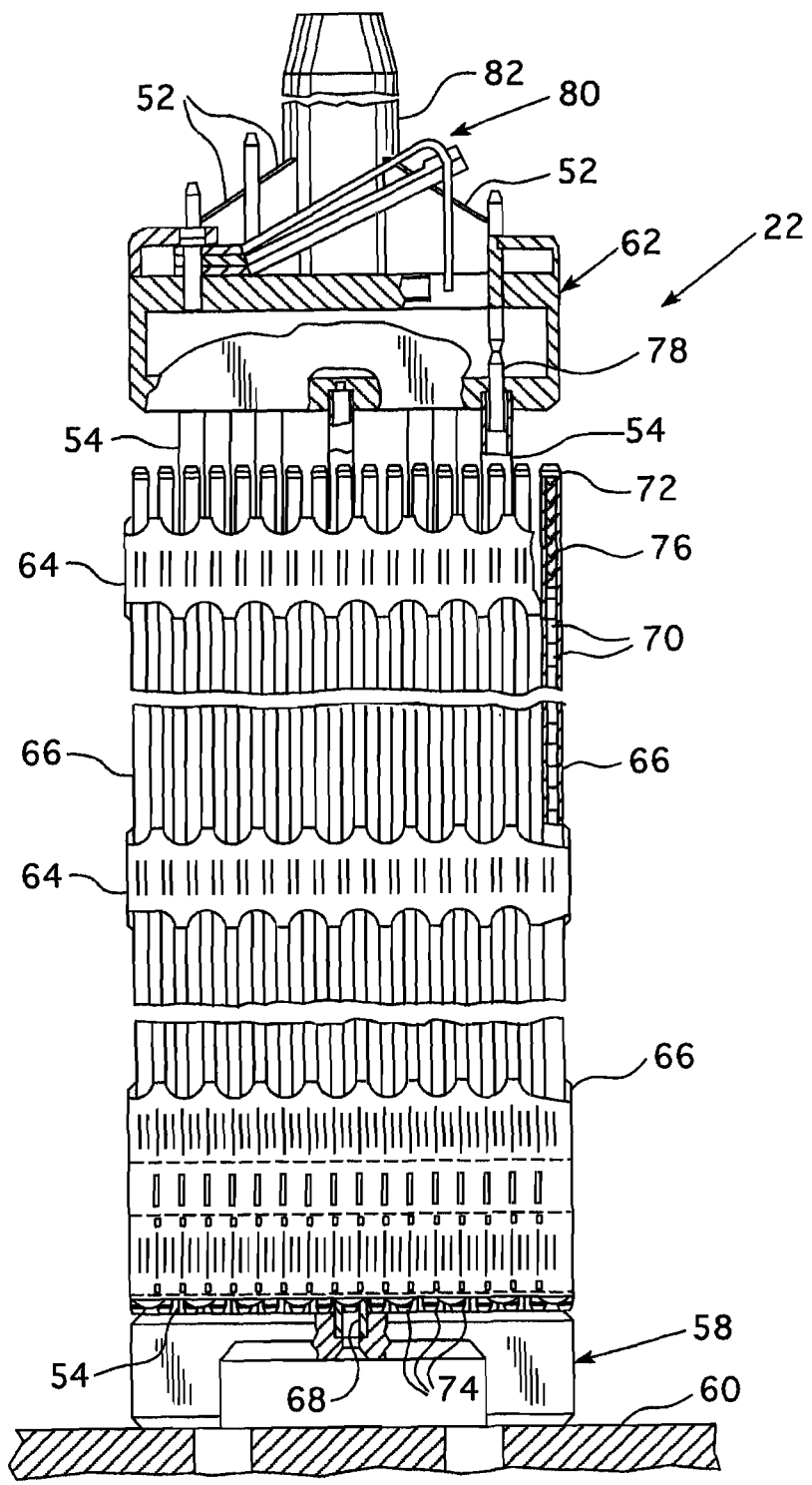

PROCESS FOR APPLICATION OF LUBRICANT TO FUEL ROD DURING FUEL ASSEMBLY LOADING PROCESS

BACKGROUND OF THE INVENTION

1. Field of the Invention

The present invention relates generally to nuclear reactors, and more particularly, to nuclear reactors having fuel assemblies that employ support grids.

2. Description of the Related Art

In most water cooled nuclear reactors, the reactor core is comprised of a large number of elongated fuel assemblies. In pressurized water nuclear reactors, these fuel assemblies typically include a plurality of fuel rods held in an organized array by a plurality of support grids spaced axially along the fuel assembly length and attached to a plurality of elongated thimble tubes. The thimble tubes typically receive control rods or instrumentation therein. Top and bottom nozzles are on opposite ends of the fuel assembly and are secured to the ends of the thimble tubes that extend slightly above and below the ends of the fuel rods.

The grids, as is known in the relevant art, are used to precisely maintain the spacing and support between the fuel rods in the reactor core, provide lateral support for the fuel rods and induce mixing of the coolant. One type of conventional grid design includes a plurality of interleaved straps that together form an egg-crate configuration having a plurality of roughly square cells which individually accept the fuel rods therein. Depending upon the configuration of the thimble tubes, the thimble tubes can either be received in the cells that are sized the same as those that receive fuel rods therein, or in relatively larger thimble cells defined in the interleaved straps. The interleaved straps provide attachment points to the thimble tubes, thus enabling their positioning at spaced locations along the length of the fuel assembly.

During the fuel rod loading process, a diligent effort is made to help assure that physical contact and dynamic friction between the rod and grid is reduced or eliminated. Nuclear fuel fabrication has demonstrated gall-ball formation at the interface between the fuel rod and the rod support features of the grid. The presence of large gal-balls at these interfaces, given the appropriate flow conditions and cycle lengths, could contribute to the formation of gaps between the fuel rod and the fuel rod support system. For example, the formation of large gaps could result in an increased rate of grid-to-rod fretting and damage of the fuel rod. In particular, in at least one nuclear reactor, it was noted that the presence of gal-balls resulted in the deepening of wear scars on the fuel rods.

Accordingly, a means of reducing or minimizing the size and quantity of gal-balls during the fuel rod loading and assembly process is desired to: (i) reduce the risk of grid-to-rod fretting resulting from the presence of gal-balls within the grid space of a nuclear fuel assembly and/or (ii) reduce the amount of debris in the reactor coolant to potentially reduce fuel assembly damage and other reactor internal damage created by substantial flow forces and circulation of debris.

SUMMARY OF THE INVENTION

This invention achieves the foregoing objective by providing a method of reducing friction and physical contact between a fuel rod and a support grid during fuel rod assembly in a nuclear fuel assembly. The method includes applying to an outer surface of the fuel rod a film of a lubricant composition. The lubricant composition includes polyalkylene glycol. The fuel rod includes zirconium, and the support grid includes a material selected from the group consisting of zirconium alloy, Inconel® alloy and mixtures thereof. The method further includes loading the fuel rod having said film applied thereon into the support grid of the nuclear fuel assembly.

BRIEF DESCRIPTION OF THE DRAWING

A further understanding of the invention can be gained from the following description of the preferred embodiments when read in conjunction with the accompanying drawings in which:

FIG. 1 is an elevational view, partially in section, of a fuel assembly in which the preferred embodiment of this invention is incorporated, the assembly being illustrated in vertically shortened form, with parts broken away for clarity.

DESCRIPTION OF THE PREFERRED EMBODIMENT

Referring now to the drawing, there is shown an elevational view, represented in vertically shortened form, of a fuel assembly being generally designated by reference character 22. The fuel assembly 22 is the type used in a pressurized water reactor and has a structural skeleton which, at its lower end, includes a bottom nozzle 58. The bottom nozzle 58 supports the fuel assembly 22 on a lower core support plate 60 in the core region of the nuclear reactor. In addition to the bottom nozzle 58, the structural skeleton of the fuel assembly 22 also includes a top nozzle 62 at its upper end and a number of guide tubes or thimbles 54, which extend longitudinally between the bottom and top nozzles 58 and 62 and at opposite ends are rigidly attached thereto.

The fuel assembly 22 further includes a plurality of transverse grids 64 axially spaced along and mounted to the guide thimbles 54 (also referred to as guide tubes) and an organized array of elongated fuel rods 66 transversely spaced and supported by the grids 64. Although it cannot be seen in FIG. 1, the grids 64 are conventionally formed from orthogonal straps that are interleafed in an egg crate pattern with the adjacent interface of four straps defining approximately square support cells through which the fuel rods 66 are supported in transversely spaced relationship with each other. Also, the assembly 22 has an instrumentation tube 68 located in the center thereof that extends between and is mounted to the bottom and top nozzles 58 and 62. With such an arrangement of parts, fuel assembly 22 forms an integral unit capable of being conveniently handled without damaging the assembly of parts.

As mentioned above, the fuel rods 66 in the array thereof in the assembly 22 are held in spaced relationship with one another by the grids 64 spaced along the fuel assembly length. Each fuel rod 66 includes a plurality of nuclear fuel pellets 70 and is closed at its opposite ends by upper and lower end plugs 72 and 74. The pellets 70 are maintained in a stack by a plenum spring 76 disposed between the upper end plug 72 and the top of the pellet stack. The fuel pellets 70, composed of fissile material, are responsible for creating the reactive power of the reactor. The cladding which surrounds the pellets functions as a barrier to prevent the fission byproducts from entering the coolant and further contaminating the reactor system.

To control the fission process, a number of control rods 78 are reciprocally moveable in the guide thimbles 54 located at predetermined positions in the fuel assembly 22. Specifically, a rod cluster control mechanism 80 positioned above the top nozzle 62 supports the control rods 78. The control mechanism has an internally threaded cylindrical hub member 82 with a plurality of radially extending flukes or arms 52. Each arm 52 is interconnected to the control rods 78 such that the control rod mechanism 80 is operable to move the control rods vertically in the guide thimbles 54 to thereby control the fission process in the fuel assembly 22, under the motive power of control rod drive shafts 50 which are coupled to the control rod hubs 80, all in a well-known manner.

As previously mentioned, the fuel assemblies are subject to hydraulic forces that exceed the weight of the fuel rods and thereby exert significant forces on the fuel rods and the fuel assemblies. In addition, there is significant turbulence in the coolant in the core caused by mixing vanes on the upper surfaces of the straps of many grids, which promote the transfer of heat from the fuel rod cladding to the coolant. The substantial flow forces and turbulence can result in severe fretting of the fuel rod cladding if motion of the fuel rods is not restrained. Fretting of the fuel rod cladding can lead to a breach and expose the coolant to the radioactive byproducts within the fuel rods.

The present invention provides a method of reducing friction and physical contact between a fuel rod and a support grid during fuel assembly fabrication for nuclear fuel used in a nuclear reactor. The method includes applying a thin film of a lubricant composition to the outer surface of a fuel rod for use in fabrication of a fuel assembly for a nuclear reactor. The lubricant composition can be applied to the fuel rod prior to loading the fuel rod into the structural skeleton. In an embodiment, the lubricant composition can be applied to the fuel rod as it is pulled from the magazine into the skeleton during fuel assembly. Without intending to be bound by any particular theory, it is believed that applying the lubricant composition during pull-loading instead of dry loading produces improved results. The nuclear reactor can include various designs including those that are currently in commercial operation in nuclear plants. Nuclear reactor designs include boiling water reactors and pressurized water reactors. For ease of description, the description herein will refer to a pressurized water reactor manufactured by Westinghouse Electric Company. The thin film of lubricant composition applied to the surface of the fuel rod is operable to reduce or minimize dynamic friction and physical contact between the fuel rod and the support grid during fuel rod assembly, and thus, reduce or minimize the formation of gall-balls at the interface of the fuel rod and support grid. Gall-balls can be formed from material that is re-deposited from a scratch on the fuel rod. The presence of gall-balls has been observed in operating nuclear plants. For example, post-fabrication studies of structural skeletons at two operating nuclear plants showed the occurrence of gall-ball formation at the interface between the fuel rod and the rod support features of the mid grids. Without intending to be bound by any particular theory, it is believed that the presence of large gall-balls at these interfaces, given the appropriate flow conditions and cycle lengths, could contribute to the formation of gaps between the fuel rod and rod support features. The formation of large gaps can result in an increased rate of grid-to-rod fretting. In at least one nuclear plant, post irradiation examination (PIE) of the fuel was performed, and it was determined that after two cycles, the fuel rods showed wear of 20% or less with the deepest wear scars showing evidence that gall-balls were present on the surface of the fuel rod. Based on a detailed examination of the wear scar features and characteristics, it was concluded that the presence of the gall-balls was a factor in the formation of the deepest wear scars. It is believed that the formation of the gall-balls and the wear scars that can be caused as a result of the presence of the gall-balls may increase the risk of grid-to-rod fretting. Further, it is believed that the presence of the thin film lubricant of the present invention on the outer surface of the fuel rod can reduce or minimize the size and quantity of gall-balls formed, and therefore, reduce or minimize the risk of grid-to-rod fretting.

The fuel rods are typically made of zirconium or a zirconium alloy, and the grids into which they are inserted are typically made of a zirconium, zirconium alloy, Inconel®, Inconel® alloy or mixtures thereof.

The lubricant composition for use in the present invention can include various compounds that are effective to at least partially coat the outer surface of the fuel rod with a thin film that substantially adheres to the outer surface of the fuel rod. In an embodiment, the entire outer surface of the fuel rod is coated with the lubricant composition. The selection of the lubricant composition can consider the material to which it is being applied. In an embodiment, the thin film of the lubricant composition is being applied to a fuel rod constructed of zirconium alloy. Further, the selection of the lubricant can consider the potential impacts of residual amounts of the lubricant composition remaining on the fuel rods which will be placed in the reactor vessel, be in contact with the reactor coolant that flows through the reactor core, and ultimately, flow into the reactor coolant system of the nuclear plant. The fuel rod coated with the lubricant composition is washed following the fuel assembly build process and prior to insertion of the fuel assembly into the reactor. However, a residual amount of the lubricant composition may remain on the washed fuel rod following the wash process. Thus, the fuel assembly inserted into the reactor may include a residual amount of the lubricant composition. Thus, the lubricant composition is selected such that it does not adversely interact with the various compounds, e.g., reactor coolant, and components in the reactor vessel and related systems. In an embodiment, the lubricant composition includes polyalkylene glycol. Suitable lubricant compositions for use in the present invention include polyalkylene glycol based synthetic polymers. Non-limiting examples of suitable lubricant compositions for use in the present invention include those known under the trade name of UCON, which are commercially available from Dow Chemical Company. An example of a UCON material includes, but is not limited to, UCON 60H-5300. Typically, the lubricant composition used in the present invention has a viscosity that is temperature dependent. For example, UCON is graded 1000 by ISO 3448. In an embodiment, the viscosity of the lubricant composition is greater than about 1050 cSt at 40° C. and 178 cSt at 100° C. Further, the thickness of the thin film of lubricant composition applied to the fuel rod is not a critical feature of the present invention. The thickness of the thin film can vary widely and may depend on the specific lubricant composition being employed and the specific material onto which the film is being applied. In an embodiment, the film thickness of the lubricant composition is from about 0.0005 inch to 0.0015 inch. In alternate embodiments, the film thickness may be lesser or greater and be operable to reduce or minimize the formation of gal-balls.

The lubricant composition can also include other optional additives that are conventionally known in the art for use in coating compositions. In an embodiment, the lubricant composition includes a solvent. The solvent can be selected from various solvents known in the art. In a further embodiment, the solvent is water. Wherein the lubricant composition includes a polyalkylene glycol-water solution, the solution is maintained at a temperature such that the polyalkylene glycol (e.g., commercially available under the trade name UCON) is soluble in the water. In an embodiment, the solution is at a temperature of less than 140° F.

In the present invention, the lubricant composition can be applied to the outer surface of the fuel rod to form a thin film using a variety of conventional techniques that are known in the art for depositing a coating on a substrate. Non-limiting examples can include spraying (e.g., air or airless), brushing, wiping, dipping, printing, streamlining (e.g., waterfall curtain) and the like. Further, the thin film lubricant may be allowed to dry or set at ambient conditions (e.g., room temperature), or in alternate embodiments, the thin film lubricant can be subjected to heat or curing conditions known in the art for setting or curing coatings and films.

Moreover, the lubricant composition for use in the present invention is selected such that following deposition in the form of a thin film on the fuel rod, the fuel rod can be washed to substantially remove the lubricant composition from the outer surface of the fuel rod prior to its insertion in the reactor The removal of the lubricant composition can be accomplished by a variety of techniques. Preferably, the lubricant composition can be relatively easily removed therefrom. In an embodiment, the lubricant composition is removed by washing the outer surface of the fuel rod or the entire assembly using rinse solutions, temperatures and soak times that are conventional in the coatings art. In a further embodiment, the lubricant composition is water soluble at room temperature. In another embodiment, after the fuel assembly is assembled, the entire assembly can be subjected to a wash process to remove the lubricant composition prior to its insertion in the reactor. As previously indicated, a residual amount of the lubricant composition may remain on the washed fuel rod or assembly. The residual amount of the lubricant composition may vary depending on the wash fluid and wash process used to remove excess lubricant composition from the coated fuel rod or assembly. In one embodiment, the entire fuel assembly is subjected to a wash process, and the residual amount of lubricant composition remaining on the washed fuel assembly is less than 40 grams per fuel assembly.

Employing the process of the present invention can result in eliminating time- and labor-intensive steps typically required for manually removing large gall-balls on fuel rod surfaces and/or reducing the risk of grid-to-rod fretting to improve fuel cycle performance.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the breadth of the appended claims and any and all equivalents thereof.

The invention claimed is:

1. A method to reduce friction and physical contact between an outer surface of a fuel rod and a support grid in a fuel rod assembly of a nuclear reactor during loading of the fuel rod into the support grid, comprising:
    applying to the outer surface of the fuel rod a lubricant composition to form a film thereon, said lubricant composition comprising polyalkylene glycol; and
    loading the fuel rod having said film applied thereon into the support grid of the fuel rod assembly,
    wherein the friction and physical contact between the outer surface of the fuel rod and the support rid loading is reduced as a result of the film formed on the outer surface of the fuel rod.

2. The method of claim 1, wherein the lubricant composition further comprises a solvent.

3. The method of claim 2, wherein the solvent is water.

4. The method of claim 3, wherein the lubricant composition and the water are combined to form a lubricant-water mixture and the lubricant-water mixture is maintained at a temperature of less than 140° F. for the applying to the outer surface of the fuel rod.

5. The method of claim 1, wherein the lubricant composition has a viscosity of greater than about 1050 cSt at 40° C. and 178 cSt at 100° C.

6. The method of claim 1, wherein the film has a thickness of from 0.0005 inch to 0.0015 inch.

7. The method of claim 1, further comprising:
    washing the fuel rod having said film applied thereon and loaded into the support grid of the fuel rod assembly to substantially remove the lubricant composition; and
    inserting the fuel rod having said lubricant composition substantially removed therefrom into the nuclear reactor.

8. A method for loading a coated fuel rod into a support grid of a fuel rod assembly for a nuclear reactor to reduce friction and physical contact between an outer surface of the fuel rod and the support grid, and for inserting the fuel rod into the nuclear reactor so as to substantially reduce an amount of coating composition from contacting reactor coolant in the nuclear reactor, comprising:
    applying to the outer surface of the fuel rod a lubricant composition to form a film thereon, said lubricant composition comprising polyalkylene glycol;
    loading the fuel rod having said film applied thereon into the support grid of the fuel rod assembly;
    washing the fuel rod having said film applied thereon and loaded into the support grid of the fuel rod assembly to substantially remove the lubricant composition; and
    inserting the fuel rod having said lubricant composition substantially removed therefrom into the nuclear reactor.

* * * * *